J. P. JENSEN.
COASTER BRAKE.
APPLICATION FILED FEB. 27, 1919.

1,306,698.

Patented June 17, 1919.
2 SHEETS—SHEET 1.

Inventor
James P. Jensen
By Max A. Schmidt
Attorney

J. P. JENSEN.
COASTER BRAKE.
APPLICATION FILED FEB. 27, 1919.

1,306,698.

Patented June 17, 1919.
2 SHEETS—SHEET 2.

Inventor
James P. Jensen
By Max A. Schmidt
Attorney

UNITED STATES PATENT OFFICE.

JAMES P. JENSEN, OF ESCANABA, MICHIGAN.

COASTER-BRAKE.

1,306,698.  Specification of Letters Patent. Patented June 17, 1919.

Application filed February 27, 1919. Serial No. 279,510.

*To all whom it may concern:*

Be it known that I, JAMES P. JENSEN, a citizen of the United States, residing at Escanaba, in the county of Delta and State of Michigan, have invented certain new and useful Improvements in Coaster-Brakes, of which the following is a specification.

This invention relates to brakes employed in connection with bicycles, motor-cycles and the like, and generally known as coaster brakes.

The invention has for its object to provide a mechanism of the kind stated which operates smoothly and efficiently, and which is entirely devoid of complicated parts liable to get out of order.

The object stated is attained by means of a novel combination, and arrangement of parts to be hereinafter described and claimed, and in order that the same may be better understood, reference is had to the accompanying drawings, forming a part of this specification.

Figure 1:
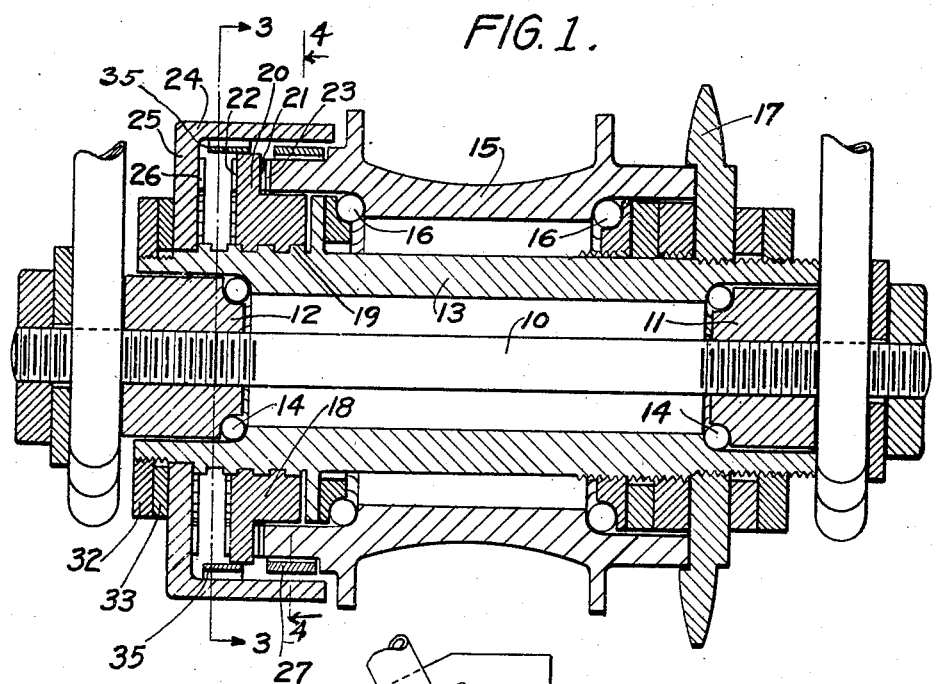
Figure 1 is a central longitudinal section of the device.

Referring specifically to the drawings, 10 denotes a stationary axle which is locked to the rear fork of the motor-cycle or other machine in the customary manner. The axle carries bearing cones 11 and 12, respectively, supporting a sleeve 13, with anti-friction balls 14 interposed between said parts. The sleeve 13 serves as a carrier and driver for the hub proper, the latter being shown at 15. The hub 15 is hollow to fit loosely over the sleeve 13, and it is supported by ball-bearings 16 carried by the latter. On one end of the sleeve 13 is fixed a sprocket wheel 17. The sleeve 13 is the driving member of the hub 15, a clutch mechanism, to be presently described, being provided for transmitting the motion of the sleeve to the hub. The sleeve 13 receives motion from the sprocket wheel 17, or any other suitable driver.

The end of the sleeve 13, opposite the end to which the driver 17 is attached, carries a clutch member 18 which is internally threaded to fit an external worm thread 19 on the sleeve, whereby, when the sleeve is rotated, the clutch member is shifted laterally on the sleeve. The clutch member 18 has an outstanding peripheral flange 20 both sides of which are provided with ratchet teeth, the teeth on one side being denoted by the reference character 21 and those of the other side by the reference character 22.

The clutch member 18 is so positioned that its flange 20 is opposite the end of the hub 15, and on said end are ratchet teeth 23 which are opposite the teeth 21. It will therefore be seen that when the clutch member 18 is shifted inwardly until the teeth 21 and 23 interlock, the motion of the sleeve 13 is transmitted to the hub 15.

Over that end of the hub 15 having the clutch teeth 23 is fitted a brake housing 24 having its end wall 25, on the inside, provided with a ratchet ring 26 which is opposite the ratchet teeth 22 of the clutch member 18, so that when the latter is shifted outwardly until the teeth 22 interlock with the teeth 26, the motion of the sleeve 13 is transmitted to the housing 24 and the latter turns with the sleeve.

At 27 is shown a brake band which is positioned to extend around the clutch end of the hub 15. One end of this band is fastened to the housing 24 as shown at 28, and after passing around the braking surface of the hub it extends from the housing through an opening 29 therein, the projecting end of the band being anchored to a pin 30 carried by an attaching plate 31 which is suitably fastened to the frame of the motor-cycle or other machine. The end wall 25 of the housing 24 has an aperture to fit loosely on the clutch end of the sleeve 13, and it is held against endwise separation from the latter by a nut 32 and a washer 33.

Figure 2:
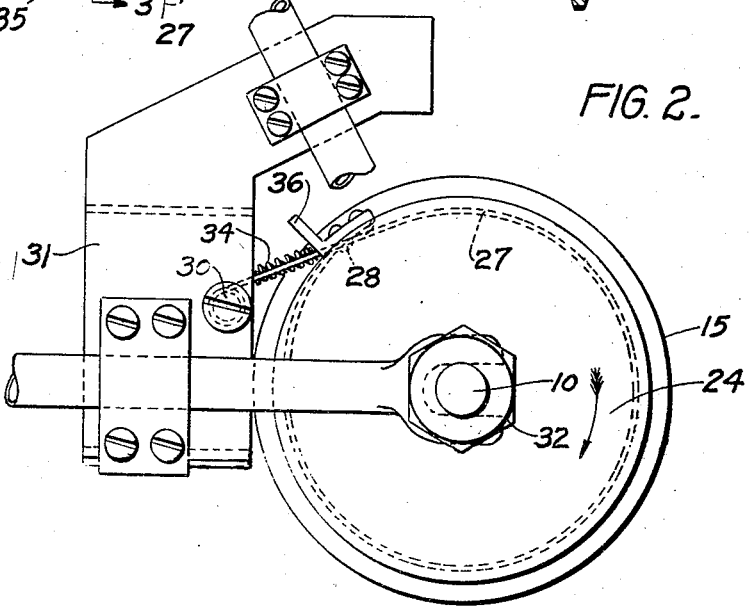
Fig. 2 is an end view thereof.
Figure 3:
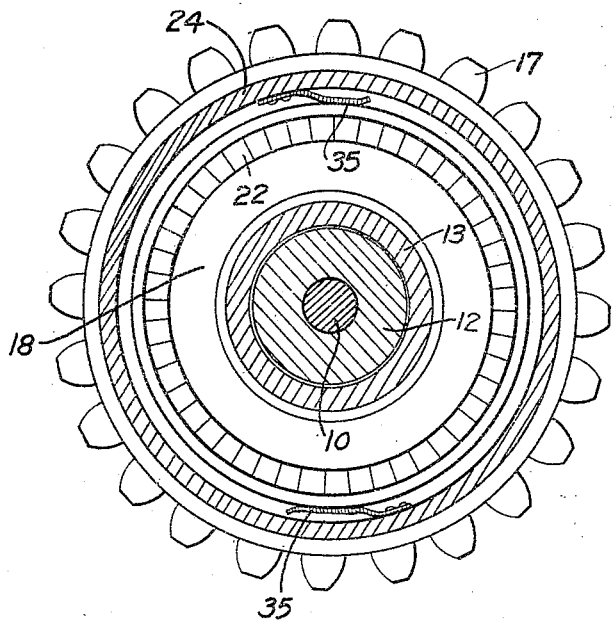
Fig. 3 is a cross section on the line 3—3 of Fig. 1.

Inasmuch as one end of the brake band 27 is anchored to the stationary plate 31, and the other end is fastened to the housing 24, it will be evident that when the member 18 is clutched to the housing through the teeth 22 and 26, and the housing starts to turn backward, as indicated by the arrows in Fig. 2, the band is tightened around the braking surface of the hub 15 and the brake is thus applied to check the speed of the hub or to lock the same against rotation. The brake is thus applied by "back pedaling" or rotating the sleeve 13 backward, whereupon the clutch member 18 travels outward to bring its teeth 22 into mesh with the teeth 26 on the brake housing 24, and the latter turns backward with the sleeve. It will be understood, of course, when this outward movement of the clutch member occurs, its teeth 21 are disengaged from the clutch teeth 23 of the hub 15, so that the latter is now free of the driving sleeve 13.

A coiled spring 34 extends between and is fastened to the housing 24 and the outer end of the brake band 27 or its anchoring pin 30. This spring is stretched and placed under tension by the turning movement of the housing 24 to apply the brake, and serves to turn the housing back in the opposite direction to release the brake.

The interior of the housing carries a pair of diametrically opposite flat springs 35 which engage the periphery of the flange 20 of the clutch member 18 with sufficient pressure to prevent the clutch member from rotating on the threaded portion 19 of the driving sleeve 13, and thus assure the lateral movement of the clutch member when in neutral position, it being understood that the clutch member is not intended to rotate relative to the sleeve but to travel back and forth along the same only.

On the brake housing 24 is a stop lug 36 positioned to come against the plate 31 or any other stationary part, to prevent the housing from being carried over so far as to break the brake band 27.

Figure 4:
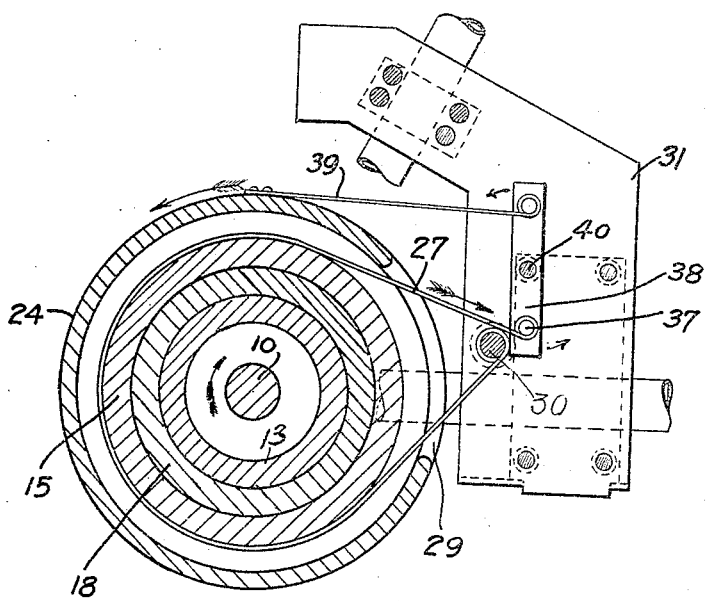
Fig. 4 is a cross section on the line 4—4 of Fig. 1 and also showing a modified brake structure.

Fig. 4 shows another application of the invention. Here the brake band 27 is anchored at one end to the attaching plate 31, or to some other stationary part outside the housing 24, with the other end of the band anchored, as shown at 37, to one end of a lever 38, the opposite end of the latter being connected by a strap or other suitable member 39 to the housing 24. The lever 38 is pivoted intermediate its ends to the plate 31, as shown at 40. In this construction, when the housing 24 turns backward as before, the strap 39 pulls on the lever 38 and swings the latter in a direction to tighten the band 27 to apply the brake. In this form of the invention the brake is applied with the running of the wheel, as will be evident from Fig. 4 in which the directions in which the parts move are indicated by arrows.

I claim:

1. The combination of a hub, a driving member therefor, means for establishing a driving connection between the hub and the driving member, said means including a longitudinally movable clutch member, a rotatable member supported by the driving member and adapted to be coupled thereto by the clutch member when said driving member is rotated backward, a brake band engageable with the hub, and a connection between the rotatable member and the brake band for setting the latter when the rotatable member is coupled to the driving member.

2. The combination of a hub, a driving member therefor, a rotatable member supported by the driving member, a longitudinally movable clutch member for establishing a driving connection between the hub and the driving member when the latter is rotating forwardly, and between the rotatable member and the driving member when the latter is rotated backward, a brake band engageable with the hub, and connection between the rotatable member and the brake band for setting the latter when the rotatable member is coupled to the driving member.

3. The combination of a hub having clutch teeth at one end, a driving member for the hub, a rotatable member supported by the driving member and having clutch teeth, a longitudinally movable clutch member on the driving member and having clutch teeth on one side adapted to engage the clutch teeth of the hub, and clutch teeth on the opposite side adapted to engage the clutch teeth of the rotatable member, a connection between the driving member and the clutch member for shifting the same into clutching engagement with the hub when the driving member is rotating forwardly, and for shifting said clutch member in an opposite direction for engagement with the rotatable member when the driving member is rotated backward, a brake band engageable with the hub, and a connection between the rotatable member and the brake band for setting the latter when the rotatable member is coupled to the driving member.

4. The combination of a hub having a clutch engaging surface at one end, a rotatable member adjacent to said end of the hub and also having a clutch engaging surface, a driving member supporting the aforesaid rotatable member, a longitudinally movable clutch member carried by the driving member between the aforesaid clutch engaging surfaces and movable into engagement with one of said surfaces when the driving member turns in one direction, and into engagement with the other surface when the driving member is turned in the opposite direction, a brake band engageable with the hub, and a connection between the rotatable member and the brake band for setting the latter when the rotatable member is coupled to the driving member.

In testimony whereof I affix my signature.

JAMES P. JENSEN.